United States Patent
Witt et al.

(10) Patent No.: US 12,311,379 B2
(45) Date of Patent: May 27, 2025

(54) METHOD AND ARRANGEMENT FOR INDUSTRIAL SCALE PRODUCTION OF A SUSPENSION FOR A BATTERY

(71) Applicant: Siemens Aktiengesellschaft, Munich (DE)

(72) Inventors: Jonas Witt, Nuremberg (DE); Manfred Baldauf, Erlangen (DE); Thomas Runkler, Munich (DE); Marc Christian Weber, Munich (DE); Frank Steinbacher, Eckental (DE); Clemens Otte, Munich (DE); Arno Arzberger, Bayern (DE)

(73) Assignee: Siemens Aktiengesellschaft, Munich (DE)

( * ) Notice: Subject to any disclaimer, the term of this patent is extended or adjusted under 35 U.S.C. 154(b) by 182 days.

(21) Appl. No.: 18/138,806

(22) Filed: Apr. 25, 2023

(65) Prior Publication Data
US 2023/0338963 A1 Oct. 26, 2023

(30) Foreign Application Priority Data
Apr. 26, 2022 (EP) .................................... 22170089

(51) Int. Cl.
*B02C 17/18* (2006.01)
*B02C 25/00* (2006.01)
*H01M 4/139* (2010.01)

(52) U.S. Cl.
CPC .......... *B02C 17/1805* (2013.01); *B02C 25/00* (2013.01); *H01M 4/139* (2013.01); *B02C 17/18* (2013.01)

(58) Field of Classification Search
CPC ..... B02C 17/10; B02C 17/18; B02C 17/1805; B02C 17/183
See application file for complete search history.

(56) References Cited

U.S. PATENT DOCUMENTS

| | | | |
|---|---|---|---|
| 2007/0006965 A1* | 1/2007 | Burchardt | H01M 4/8605 156/244.24 |
| 2013/0008985 A1* | 1/2013 | Held | B02C 25/00 241/36 |

(Continued)

FOREIGN PATENT DOCUMENTS

| | | |
|---|---|---|
| CN | 107958988 | 4/2018 |
| CN | 208839711 | 5/2019 |

(Continued)

OTHER PUBLICATIONS

Makokha, Augustine B et al: "Multivariate 1-13 approach to on-line prediction of in-mill slurry density and ball load volume based on direct ball and slurry sensor data", Minerals Engineering, Elsevier, Amsterdam, NL, Bd. 26, 12. Oct. 12, 2011.

(Continued)

*Primary Examiner* — Jared O Brown
(74) *Attorney, Agent, or Firm* — Cozen O'Connor

(57) ABSTRACT

Method and apparatus for industrial scale production of a suspension for a battery, wherein an input material is processed via ball milling in a rotating chamber of a device that is effected as a continuous process with a continuously controlled addition of the input material and with a continuously controlled delivery of the processed output material, where state parameters of the input material and process parameters of the manufacturing installation are acquired as first parameters during production of the suspension, results of laboratory analyses about the state or quality of the manufactured suspension are acquired as second parameters in a learning phase during production, the first and the second parameters are used in the learning phase for training a model for predicting the state or quality via machine learning, and where the device is open-loop or closed-loop (Continued)

controlled outside the learning phase via the first parameters and the trained model.

16 Claims, 2 Drawing Sheets

(56) References Cited

U.S. PATENT DOCUMENTS

| | | | | |
|---|---|---|---|---|
| 2018/0190982 A1* | 7/2018 | Fujino | .................... | H01G 11/46 |
| 2022/0143894 A1* | 5/2022 | Dreger | .................... | B29C 48/92 |

FOREIGN PATENT DOCUMENTS

| | | |
|---|---|---|
| CN | 209362610 | 9/2019 |
| CN | 114171710 A | 3/2022 |
| JP | 2007527596 A | 9/2007 |
| JP | 2018006317 A | 1/2018 |
| JP | 2018067433 A * | 4/2018 |
| KR | 20190075659 | 7/2019 |
| WO | 2007124981 | 11/2007 |
| WO | WO-2007124981 A1 * 11/2007 ............. B02C 25/00 |
| WO | 2020216491 | 10/2020 |

OTHER PUBLICATIONS

Aditya U. Vanarase, Manel Alcalà, Jackeline I. Jerez Rozo, Fernando J. Muzzio, and Rodolfo J. Romañach Real-time monitoring of drug concentration in a continuous powder mixing process using NIR spectroscopy. Chemical Engineering Science, 65(21):5728-5733, 2010.

Li Yaoyu et al. "Prediction of ball milling performance by a convolutional neural network model and transfer learning", Powder Technology 403 (2022) 117409, pp. 1-9, Apr. 20, 2022.

* cited by examiner

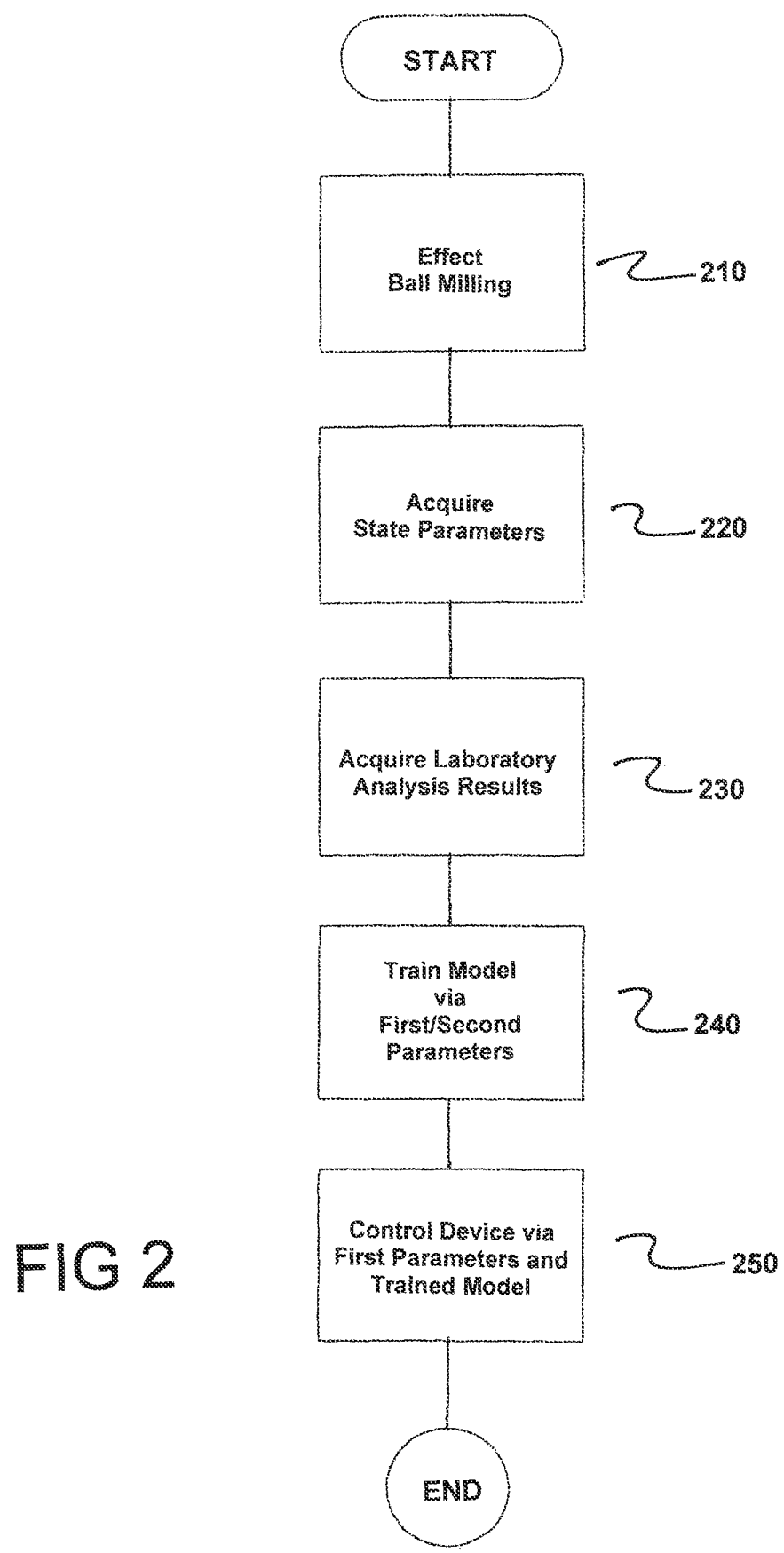

METHOD AND ARRANGEMENT FOR INDUSTRIAL SCALE PRODUCTION OF A SUSPENSION FOR A BATTERY

BACKGROUND OF THE INVENTION

1. Field of the Invention

The invention relates to an apparatus and method for the industrial scale production of a suspension for a battery.

2. Description of the Related Art

Owing to the globally growing demand for lithium-ion batteries, for example, manufacturers of battery cells are seeking ways to expand their production volumes. The batteries of battery electric motor vehicles, in particular, require a higher and higher demand for manufacturing capacities not only in regard to numbers to be produced, but also in regard to the absolute amount of materials. Manufacturers are faced with two challenges here.

First, an increase in production capacity can be achieved either by quantitative scaling of current production machines or by qualitative changes to the process. Qualitative changes to the process is more attractive to manufacturers because more efficient method steps increase both production capacity and cost effectiveness.

Second, on account of the high reject rates and the partly unknown effect relationships within production, such process adaptations that minimize the quality variations within production are especially important.

In industry, the ball milling and mixing of active material, binders/additives at the beginning of electrode manufacture is established as a batch process, i.e., a defined amount of input material is always processed and then output in one pass. The throughput is quantitatively scalable essentially via the number of mixing lines. In addition, the "batches" differ with regard to their quality. By contrast, continuous ball milling, which involves continuously feeding in input material and outputting processed output material, yields both higher throughput and (theoretically) reduced quality variations of the electrode paste produced in this was (also referred to hereinafter as suspension or "slurry") by virtue of the continuous material flow. The suspension here is an active paste that is applied or extruded onto the electrode films after mixing. However, continuous ball milling is not applied in industrial scale practice because the closed-loop control of the process is difficult on account of the long duration of quality measurements of the finished product.

This is because in order to be able to exploit the advantages of continuous ball milling and mixing in practice, precise closed-loop control of the process characteristic variables is needed to continuously output slurry with constant quality. This closed-loop control is made more difficult by a large number of influencing parameters, some of which are not measurable online (i.e., during the productive industrial scale manufacturing process) and can only be simulated inadequately, e.g., the progress of wear on the grinding balls, their thermal stability and remaining grinding force. An added consideration is that the quality of the slurry is a multidimensional feature, some factors of which in turn are not measurable online, e.g., its viscosity, its granularity and the distribution of solids fractions. The "online" measurement of these variables fails owing to the lack of availability of suitable measuring means and measuring methods that can accomplish this in a very short time and/or with tenable costs.

WO 2020/216491 A1—Dreger "Method for producing a battery" discloses a method for producing a suspension (electrode paste) of a battery, in particular for the battery of a battery electric motor vehicle, where an extruder with the suspension is controlled based on a specific energy acting on the suspension during the extrusion process, in correlation with the filling quantity of the extruder. However, this method cannot be utilized for ball milling, for the above-mentioned reasons, inter alia, and so in industrial scale application ball milling is still regularly effected in "batch mode", i.e., in batches.

Continuous ball milling and mixing has been trialled hitherto primarily in a laboratory/pilot context. Industry is dominated by batch-oriented method steps, as mentioned. The grinding of the active materials and mixing of the raw materials are controlled here via "recipes". These recipes formulate both constituents and method sequences (e.g., duration, temperature, and/or rotational speed of the mixing drum) for a specific cell chemistry. Machine operators can make control interventions in the process based on their empirical knowledge (and with the aid of laboratory-analytical examinations of the input or raw materials).

Mixing lines in industry are equipped only with rudimentary sensor systems that do not allow online measurement of the slurry quality. Recipes are generally validated in pilot installations and monitored via laboratory samples taken at random in the course of the process.

Continuous ball milling and mixing is an active research field in chemical procedures. In this regard, the literature from recent years contains experimental laboratory studies which trial continuous mixing for specific pharmaceutical applications and explore suitable sensor systems (e.g., near infrared spectroscopy (NIRS)).

The publication Aditya U. Vanarase, Manel Alcala, Jackeline I. Jerez Rozo, Fernando J. Muzzio, and Rodolfo J. Romañach. "Real-time monitoring of drug concentration in a continuous powder mixing process using NIR spectroscopy", Chemical Engineering Science, 65(21):5728-5733, 2010 discloses one such approach.

These studies here consider the homogeneous mixing of chemical active substances and differ from the present invention in three essential points. First, the concentration of a constituent is estimated via the progress of the mixing process. Here, there is no feedback to the characteristic variables of the process itself (in the sense of open-loop control). Second, a single, objectively measurable parameter is predicted (active substance concentration), in contrast to the slurry quality as a multidimensional and latent criterion. Third, the chemical starting materials have already been ground; the complexity owing to the gradual wear of the grinding balls is omitted.

Mixing processes in ball mills are a widely used process in the process industry, such as cement production. However, an online sensor system with a feedback loop is not used in that case because many product parameters (e.g., degree of grinding, homogeneity of the material to be ground, and/or particle size distribution), but also some process parameters (wear of the balls) in the process cannot be measured. If quality variations are of no consequence in such applications, then ball milling/ball mixing is also used there in a continuous method. Owing to the quality requirements in battery manufacturing, ball milling/ball mixing is used there on an industrial scale only in batch mode with defined initial conditions (e.g., for each batch new mixing balls, defined amounts and condition of the starting substances, and/or constant ambient conditions).

SUMMARY OF THE INVENTION

In view of the foregoing, it is therefore an object of the present invention to adapt existing methods and arrangements for ball milling such that, in a continuous manufacturing process, suspensions, in particular for electrodes of the batteries of battery electric motor vehicles (BEVs), can be produced with consistently high quality.

This and other objects and advantages are achieved in accordance with the invention by an arrangement and method for the industrial scale production of a suspension for a battery, i.e., an electrode of a lithium-ion rechargeable battery, in a manufacturing installation, where at least one input material is processed (ground and optionally mixed) via ball milling in at least one rotating chamber provided with grinding balls, and a resulting output material (intermediate product) is mixed with a plurality of other materials and discharged via a downstream processing unit. Here, the ball milling is effected as a continuous process with a continuously controlled addition of the at least one input material and with a continuously controlled delivery of the processed output material or an intermediate product to the downstream processing unit, where state parameters of the input material and a plurality of process parameters of the manufacturing installation are acquired as first parameters during the production of the suspension, where results of laboratory analyses of a state or a quality of at least the manufactured suspension and optionally also of the intermediate product are acquired as second parameters at least in a learning phase during production, where the first and the second parameters are used, in the learning phase, to train a model for predicting the state or the quality via machine learning, and where the device for ball milling is controlled by open-loop or closed-loop control at least outside the learning phase via the first parameters and the trained model. The use of the "soft sensor" thus formed for the achievable quality within the closed-loop control system allows closed-loop control of the milling and mixing process in the device for ball milling and/or mixing as a continuous process, where process characteristic variables are adapted such that the quality features of the emerging slurry are kept constant.

The objects and advantages are additionally achieved via an apparatus for the industrial scale production of a suspension for a battery, i.e., an electrode of a lithium-ion rechargeable battery, in a manufacturing installation, where a device for ball milling is provided for processing at least one input material in at least one rotating chamber provided with grinding balls. Here, the device for ball milling is configured to perform the ball milling as a continuous process with a continuously controlled addition of the at least one input material and with a continuously controlled delivery of the processed output material to a downstream processing unit, where first sensors are provided for acquiring state parameters of the input material and a plurality of process parameters of the manufacturing installation as first parameters during the production of the suspension, where second sensors and/or at least one analysis device are provided for acquiring, at least in a learning phase, a state or quality of at least the manufactured suspension, where a computing device is provided for training a model for predicting the state or the quality via machine learning based on the first and second parameters in the learning phase, and where provision is made of a control device configured for open-loop or closed-loop control of the device for ball milling via the first parameters and the trained model at least outside the learning phase is provided.

In one embodiment, the computing device and the control device can be identical.

Advantageously, supervised learning or reinforcement learning is used for the machine learning. A good estimation of the properties (quality) of the end-product and, depending on the embodiment, of the intermediate product can thus also be estimated after the conclusion of the learning process. Moreover, the models thus generated can also be further improved in an operational environment, e.g., through subsequent training via recorded process parameters and spot check-like analyses of the product produced in the process. If reinforcement learning is used, then a reward function directed to rewarding the least possible deviation between the predicted and the actual state or quality of at least the manufactured suspension is advantageously used in the reinforcement learning.

A significant factor that influences the quality is taken into account by a degree of wear of the grinding balls being used as one of the process parameters. If, in the process, the degree of wear is calculated from a use history of the grinding balls, then this obviates the need for repeated metrological analysis of the balls during operation.

Advantageously, a rotational speed of the device for ball milling is used as one of the process parameters because that influences both the quality or the properties of the product and the wear of the grinding balls.

Material properties of the material to be ground can be acquired indirectly by an energy consumption or a required drive torque of the device for ball milling being used as one of the process parameters. Here, these values can also be evaluated with respect to fluctuations.

The prediction and thus the precision of the control of the production device can be increased by a context parameter from the device for ball milling being used as one of the process parameters. As the context parameter, preferably, sound emissions and optionally video images from a mixing chamber of the device for ball milling are also evaluated and used.

Advantageously, the suspension is shaped to form a blank for an electrode by the downstream processing unit, i.e., an extruder. At the output of the extruder, it is possible both to obtain material samples for laboratory-analytical examinations during the learning phase and to obtain parameters that can be acquired easily in an operational environment, which serve as "feedback" for the control and thus also as input values for the trained model (artificial intelligence).

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of the present invention and the manner in which these are achieved will become clear and more plainly comprehensible in conjunction with the following description of the exemplary embodiments as explained in more detail in conjunction with the drawings, in which:

FIG. 2 is a flowchart of the method in accordance with the invention.

DETAILED DESCRIPTION OF THE EXEMPLARY EMBODIMENTS

Figure 1:
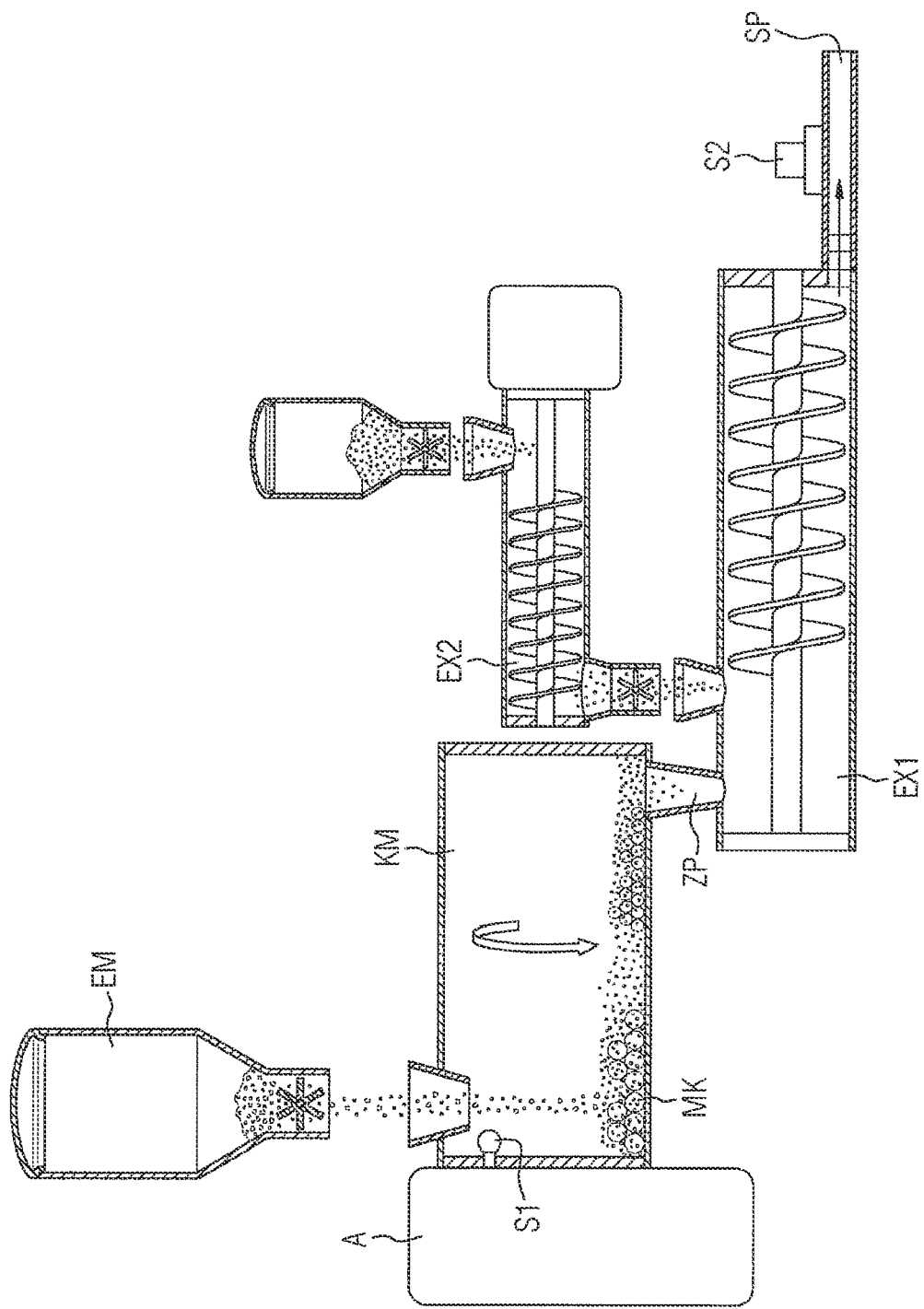
FIG. 1 is a schematic illustration of an arrangement having a device for ball milling and two extruders in accordance with the invention.

FIG. 1 shows an arrangement comprising a device for ball milling KM and two extruders EX1, EX2. Input materials EM are fed to the ball mill KM ("device for ball milling"). The output stream thereof consists of the intermediate product ZP, which in this example is fed together with an output product of the extruder EX2 to the extruder EX1. The output stream thereof consists of the finished suspension SP (for short: slurry), which is extruded in the form of a blank of an electrode.

The manufacturing installation, in particular the ball mill KM, is equipped with a first sensor system S1 for monitoring and open-loop and/or closed-loop control of the operational environment (regular operation). For the sensor system S1, a microphone in the grinding drum is illustrated by way of example in the FIG. 1. First parameters of the state (e.g., temperature, granularity, and/or mass flow of the feed stream) of the input materials EM are acquired by the first sensor system S1. However, the first parameters also include process parameters of the manufacturing installation, in particular of the ball mill KM (for example, rotational speed; age, quantity and size of the grinding balls MK; temperature; degree of filling of the drum; required power or torque/torque profile of the drive A) and context parameters (e.g., audio recordings from the grinding drum; fluctuations ("ripple") of the drive torque; vibrations; video images). Non-measurable properties of the input material EM, such as origin/supplier, or period in storage, are likewise part of the first parameters. Some sensors of the first sensor system S1 can also be positioned differently. By way of example, at the output of the extruder EX1, they can continuously acquire properties of the extruded material (suspension SP—"slurry"), e.g., parameters of the flow behaviour (pressure, dispersion). It should be noted here that the sensor system S1 operates constantly and in real time ("online") during ongoing regular operation.

The manufacturing installation is furthermore equipped at least temporarily with a second sensor system S2 or such a system is added or made available externally in particular in a learning phase. That involves, for example, (devices for) laboratory analyses, in particular of the finished product, i.e., of the suspension SP. In an operational environment, the second sensor system S2 is either not available at all or only available for random samples or is at least so slow/sluggish that the values thereof cannot be used for closed-loop control. The second parameters thereby acquired thus primarily concern the quality of the finished product SP. By way of example, a hyperspectral analysis or near infrared spectroscopy can be used for this purpose. The second parameters also include other mechanical (e.g., toughness, fracture toughness) or chemical or electrical properties.

In one embodiment, at least some of the first and second parameters can also be acquired or even exclusively at the intermediate product ZP. This holds true particularly if a second extruder EX2 with further materials is not used and the first extruder EX1 serves only for extruding the suspension SP and not for admixing the further materials and thus has hardly any influence on essential product properties.

The second parameters are important controlled variables for the control of the manufacturing installation, in particular of the ball mill KM and the inflow and outflow of the ball mill KM. However, they are not constantly available and often not in real time either. It is therefore necessary for these second parameters to be provided via a model, i.e., for the operational environment, the second sensor system S2 is intended to be replaced via the model parameterized in the training phase, where the model supplies the required second parameters in real time. This is also referred to as a "soft sensor" or "virtual sensor".

For this purpose, the manufacturing installation is equipped with a computing apparatus, such as an industrial controller (not shown) with a neural processor, in which the model is stored or is processed, for example, in the form of a trained neural network. The model is controlled with the sensor values from the first sensor system that are available during ongoing operation and with the other first parameters and, in accordance with its parameterization, yields the second parameters, i.e., the predicted quality of the finished suspension SP.

For the training (also called parameterization) of the model, use is made of "supervised learning" or "reinforcement learning", i.e., established methods in the context of artificial intelligence. The training can occur in the above-described computing apparatus (primarily the industrial controller). However, the model can also be trained externally. From time-to-time, the model can be monitored or refined (retrained) via laboratory analyses of random samples, i.e., via the second sensor system S2. For the (re)training, possibly recorded ("logged") data of the first parameters are correlated with the second parameters obtained later based on the material manufactured in this case, and the model is thereby trained or refined. That is, even lengthy analyses of the suspension are possible because the results thereof do not have to be already available during operation for the purpose of training the model, but rather are correlated with the recorded ("logged") manufacturing data. By contrast, in the operational environment, the model trained here can, "online" and with virtually no delay here, yield a prediction of the quality or properties of the material currently being produced, which makes possible a closed-loop control system. As a result, a continuous manufacturing process is made possible instead of a "batch-based" manufacturing process. Here, further parameters can also be estimated and included in the model, in particular the degree of wear of the grinding balls MK.

The method in accordance with the disclosed embodiments uses "supervised learning" methods to derive a prediction model for online estimation of the slurry quality in the milling and mixing process of electrode manufacture. This is influenced by, inter alia, the process characteristic variables as time series (e.g., rotational speed, number and age of the grinding balls), context parameters (e.g., audio recordings and vibrations of the mixing drum, ambient temperature) and also the characteristics of the raw materials EM (e.g., laboratory analyses, origin, age, temperature during filling).

The quality of the slurry is determined laboratory-analytically during the model training and optionally at later times (quality control, retraining). The analyses for this purpose can contain the target values of "good" salaries on the online sensors available for acquiring the quality in production. Furthermore, more complex laboratory analyses, not implemented online within production, can be used for determining the slurry quality. By way of example, visual information (e.g., the spectrum) or flow properties (e.g., dispersion, viscosity) for slurries of good quality is/are acquired.

In regular industrial scale production, exclusively parameters measurable online can be acquired (e.g., the spectrum of the slurry flowing out of the mixing process, but often, e.g., no dispersion or viscosity or the like). These are either compared directly with the comparison values of good slurries from the laboratory setting or correlated with more complex laboratory-analytical measurements with the aid of the above-described soft sensor.

In the next step, this online quality model is used for constantly predicting the slurry quality in ball milling and mixing (e.g., directly in the ball mill or in the extruder EX1). With the aid of methods pertaining to "reinforcement learning", for example, a control policy (control specification) of the production parameters (e.g., rotational speed, addition of new grinding balls, amount of solvent, additives) is learned that matches the slurry quality predicted by the prediction model to the target values of the quality dimensions. Here, the closed-loop control, via screen outputs or the like, can function as assistance for the machine operator or intervene autonomously in the process as closed-loop controller. Mixed forms are possible.

Ball milling and mixing is scalable as a batch process primarily by the procurement of new lines/machines. Continuous milling and mixing offers a more efficient scaling of the production capacities through the adaptation of the production characteristic parameters (e.g., rotational speed). Moreover, the throughput can thus be controlled more flexibly.

By virtue of the continuous material discharge, quality variations between batches are eliminated, which stabilizes the production process and reduces reject rates.

The use of a soft sensor concept makes it possible to use readily available online measurements in the production process for the live quality assessment of the emerging slurry. Consequently, cost savings associated with expensive measuring instruments on each line occur. Such quality assessments, which hitherto have only been able to be obtained via laboratory-analytical measurements and have not been able to be performed online (not even with an expensive sensor system), are nevertheless available online (in real time) by way of the soft sensor.

The use of the soft sensor within a closed-loop control system allows closed-loop control of the milling and mixing process, which adapts process characteristic variables so that the quality features of the emerging slurry are kept constant and at the required level.

The soft sensor and the closed-loop control system based thereon extend the available automation solutions for electrode production. A soft sensor can be integrated in the quality monitoring of the production process for the purpose of predicting the slurry quality. An autonomous closed-loop control technique strengthens the process control and allows data-driven optimization to be incorporated in existing automation solutions.

The information technology methods for training a soft sensor or learning a control policy based on sensor data are conventional methods pertaining to machine learning, i.e., artificial intelligence. The application to continuous ball milling and mixing is novel, however. In particular, taking account of ball wear as part of the process characteristic variables, the multidimensional description of the slurry quality (viscosity, distribution of solids fractions, moisture fraction, . . . ) in a single soft sensor and dispensing with special sensor systems in the operational environment are the essential core aspects of the present solution.

FIG. 2 is a flowchart of the method for industrial scale production of a suspension SP for a battery in a manufacturing installation, where at least one input material (EM) is processed via ball milling in at least one rotating chamber of a device KM for ball milling, the chamber includes grinding balls MK, and where the output material ZP is mixed with a plurality of other materials and discharged via a downstream processing unit EX1.

The method comprises effecting the ball milling as a continuous process with a continuously controlled addition of the at least one input material EM and with a continuously controlled delivery of the processed output material ZP to a downstream processing unit EX1, as indicated in step 210.

Next, state parameters of the at least one input material EM and a plurality of process parameters of the manufacturing installation are acquired as first parameters during the production of the suspension SP, as indicated in step 220.

Next, results of laboratory analyses regarding a state or a quality of at least the manufactured suspension SP are acquired as second parameters at least in a learning phase during production, as indicated in step 230.

Next, the first and the second parameters are utilized to train, during the learning phase, a model for predicting the state or the quality via machine learning, as indicated in step 240.

Next, the device KM for ball milling is controlled by open-loop or closed-loop control at least outside the learning phase via the first parameters and the trained model, as indicated in step 250.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for industrial scale production of a suspension for a battery in a manufacturing installation, the method comprising:
    ball milling at least one input material in at least one rotating chamber of a device for the ball milling, said chamber including grinding balls;
    effecting the ball milling as a continuous process with a continuously controlled addition of the at least one input material and with a continuously controlled delivery of processed output material to a downstream processing unit;
    mixing the processed output material with a plurality of other materials and discharging the mixture via the downstream processing unit;
    acquiring state parameters of the at least one input material and a plurality of process parameters of the manufacturing installation as first parameters during the production of the suspension;

acquiring results of laboratory analysis regarding a state or a quality of at least the suspension as second parameters at least in a learning phase during production;

utilizing, during the learning phase, the first and the second parameters to train a model for predicting the state or the quality via machine learning; and controlling the device for ball milling by open-loop or closed-loop control at least outside the learning phase via the first parameters and the trained model.

2. The method as claimed in claim 1, wherein supervised learning or reinforcement learning is utilized for the machine learning.

3. The method as claimed in claim 2, wherein a reward function directed to rewarding a least possible deviation between a predicted and an actual state or quality of at least the manufactured suspension is utilized in cases of reinforcement learning.

4. The method as claimed in claim 1, wherein a degree of wear of the grinding balls is utilized as a parameter of the first and second process parameters.

5. The method as claimed in claim 4, wherein the degree of wear is calculated from a use history of the grinding balls.

6. The method as claimed in claim 1, wherein a rotational speed of the device for ball milling is utilized as a parameter of the first and second process parameters.

7. The method as claimed in claim 1, wherein an energy consumption or a required drive torque of the device for ball milling is utilized as a parameter of the first and second process parameters.

8. The method as claimed in claim 1, wherein a context parameter from the device for ball milling is utilized as a parameter of the first and second process parameters.

9. The method as claimed in patent claim 8, wherein sound emissions from a mixing chamber of the device for ball milling are utilized as the context parameter.

10. The method as claimed in claim 1, wherein results from laboratory analysis of an intermediate product at an output of the device for ball milling are additionally utilized as the second parameters.

11. The method as claimed in claim 1, wherein values from state sensors for an intermediate product at an output of the device for ball milling are additionally utilized as the first parameters.

12. The method as claimed in claim 1, wherein the suspension is shaped to form a blank for an electrode by the downstream processing unit.

13. The method as claimed in claim 12, wherein the downstream processing unit comprises an extruder.

14. The method as claimed in claim 1, wherein the suspension is applied to an electrode of a lithium-ion rechargeable battery.

15. An apparatus for industrial scale production of a suspension for a battery in a manufacturing installation, the apparatus comprising:

a device for ball milling, said device being utilized to process at least one input material in at least one rotating chamber provided with grinding balls and said device being configured for ball milling as a continuous process with a continuously controlled addition of the at least one input material and with a continuously controlled delivery of a processed output material to a downstream processing unit;

first sensors configured to acquire state parameters of the input material and a plurality of process parameters of the manufacturing installation as first parameters during the production of the suspension;

second sensors and/or at least one analyzer configured to acquire, at least in a learning phase, a state or quality of at least the manufactured suspension;

a computing device configured to train a model for predicting the state or the quality via machine learning based on the first and the second parameters acquired in the learning phase; and a control device configured for open-loop or closed-loop control of the device for ball milling via the first parameters and the trained model at least outside the learning phase.

16. The apparatus as claimed in claim 15, wherein the suspension is applied to an electrode of a lithium-ion rechargeable battery.

* * * * *